United States Patent
Yasuda

(10) Patent No.: US 6,221,529 B1
(45) Date of Patent: *Apr. 24, 2001

(54) POSITIVE ELECTRODE FOR LITHIUM BATTERY AND LITHIUM BATTERY

(75) Inventor: Hideo Yasuda, Kyoto (JP)

(73) Assignee: Japan Storage Battery Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,485

(22) Filed: Nov. 18, 1997

(30) Foreign Application Priority Data

| Nov. 18, 1996 | (JP) | 8-323608 |
| Nov. 18, 1996 | (JP) | 8-323609 |
| Dec. 5, 1996 | (JP) | 8-342517 |

(51) Int. Cl.[7] .................................... H01M 4/52
(52) U.S. Cl. .................................. 429/223; 429/235
(58) Field of Search .................... 429/218.1, 221, 429/235, 245, 223; 423/594

(56) References Cited

U.S. PATENT DOCUMENTS

| 5,180,574 | * | 1/1993 | Von Sacken | 423/594 |
| 5,376,475 | * | 12/1994 | Ovshinsky et al. | 429/101 |
| 5,597,665 | * | 1/1997 | Harada et al. | 429/235 |
| 5,630,993 | * | 5/1997 | Amatucci et al. | 423/594 |
| 5,702,844 | * | 12/1997 | Bernard et al. | 429/223 |
| 5,747,195 | * | 5/1998 | Alamgir et al. | 429/235 |
| 5,795,580 | * | 8/1998 | Ikeda et al. | 429/245 |

FOREIGN PATENT DOCUMENTS

| 0573040 | 12/1993 | (EP) . |
| 0714144 | 5/1996 | (EP) . |
| 0730315 | 9/1996 | (EP) . |
| 0800222 | 10/1997 | (EP) . |
| 56-71276 | * 6/1981 | (JP) ............... H01M/4/52 |

OTHER PUBLICATIONS

Patent Abstracts Of Japan, vol. 012, No. 228 (E–627), Jun. 28, 1988 for JP 63 019760 A (Japan Storage Battery Co., Ltd.), Jan. 27, 1988.

* cited by examiner

Primary Examiner—Carol Chaney
(74) Attorney, Agent, or Firm—Sughrue, Mion, Zinn, Macpeak & Seas, PLLC

(57) ABSTRACT

A positive electrode for a lithium battery wherein nickel oxyhydroxide is held in an electro-conductive three-dimensional porous material or a sintered nickel substrate and a lithium battery using it. When the three-dimensional porous material is used, the electric contact of the active material and the current collector is good, also the contact state of nickel oxyhydroxide particles, which are active materials, each other is good, further, the contact resistance among the particles is low, and also the diffusion of the lithium ion, which is the rate-determining step of the reaction, becomes easy among the particles. Furthermore, in a positive electrode for a lithium battery wherein lithium is intercalated into nickel oxyhydroxide by discharging and lithium is disintercalated from nickel oxyhydroxide by charging, the positive electrode contains at least one kind selected from the group of cobalt oxyhydroxide, metallic cobalt, cobalt oxide, tricobalt tetroxide, lithium cobaltate, and proton-containing cobalt dioxide.

15 Claims, 3 Drawing Sheets

POSITIVE ELECTRODE FOR LITHIUM BATTERY AND LITHIUM BATTERY

BACKGROUND OF THE INVENTION

1. Field of the Invention

The present invention relates to a positive electrode for lithium battery and to a lithium battery using it.

2. Description of the Related Art

Conventionally, for an electric power source for electronic instruments, a manganese dioxide-zinc battery is used as a primary battery and a nickel battery such as a nickel-cadmium battery, a nickel-zinc battery, and a nickel-hydride battery, and a lead battery are used as a secondary battery. As the electrolyte for these batteries, alkaline solution such as potassium hydroxide or acid solution of sulfuric acid is used.

Recently, with the progress of electronic instruments, a new high-performance battery has been expected and the development of a high energy density battery using a nonaqueous electrolyte has been proceeded in place of the above-described aqueous electrolyte battery. As the typical battery, there is a lithium battery using lithium or a carbon material as a negative electrode.

The lithium battery includes a primary battery such as a manganese dioxide-lithium battery and fluorinated carbon-lithium battery and a secondary battery such as a manganese dioxide-lithium battery, a vanadium oxide-lithium battery, etc.

The secondary battery using metallic lithium as the negative electrode has a disadvantage that a short-circuit is apt to occur by the dendritic growth of metallic lithium deposited at charging and the life is short. Also, there is a problem that it is difficult to ensure the safety thereof owing to the high reactivity of metallic lithium. Thus, a so-called lithium ion battery using graphite, carbon or the like as the negative electrode to prevent the dendritic deposition of the metallic lithium by forming an intercalation compound thereof with lithium and using lithium cobaltate as the positive electrode has been devised and the battery is used as a high energy density battery.

However, because lithium cobaltate is expensive, a lithium-containing manganese composite oxide or lithium nickelate is proposed for lithium cobaltate. In the case of the lithium-containing manganese composite oxide, there is a problem that the theoretical capacity is low and also with the progress of the charge-discharge cycle, the reduction of the obtained capacity becomes large.

On the other hand, lithium nickelate has the same crystal structure as lithium cobaltate but has a fault that when charging and discharging are repeated, the capacity is decreased. Recently, there is provided an attempt of synthesizing lithium nickelate exhibiting a homogeneous charging-discharging reaction by lithium nitrate and nickel oxyhydroxide containing cobalt. However, in any case, to make a positive electrode using lithium nickelate, a process of grinding the course particles after synthesis to form fine particles, mixing the fine particles with carbon, etc., as an electro-conductive material, and coating the mixture together with a binder such as polyviylidene fluoride and the like on to a metal current collector such as aluminum, nickel and the like is required. Accordingly, there is a problem that the production process is complicated and also the performance is strongly influenced by the amounts of the carbon powder and the binder.

Furthermore, there is an attempt of making a positive electrode for a lithium battery using nickel oxyhydroxide which is an utterly different active material from the above-described active materials. For example, in Unexamined Japanese Patent Publication (kokai) No. Sho-63-19760, it is proposed to use nickel oxyhydroxide containing from 20 to 75% cobalt and in Unexamined Japanese Patent Publication (kokai) No. Sho-63-19761, it is proposed to use nickel hydroxide charged in an aqueous solution of lithium hydroxide as an active material, but they are insufficient in the performance and have not yet been practically used up to now.

As described above, nickel oxyhydroxide has the same layer structure as lithium cobaltate practically used but in spite of that nickel oxyhydroxide is proposed in Unexamined Japanese Patent Publication (kokai) No. Sho-63-19760, it has not been practically used up to now. When the cause is considered from the view point of electrode reaction, it is considered to be caused by that the diffusion of lithium ion into the positive electrode active material with the charging-discharging reaction, that is, the intercalation of the lithium ion into nickel oxyhydroxide does not uniformly occur. Also, it is considered to be one of the causes that the optimum electrode structure of the active material and the current collector has not yet been established.

Aluminum is mainly used for the material of a current collector which is used for a positive electrode of a lithium battery at present. For the nickel hydroxide positive electrode of a nickel-cadmium battery and a nickel-hydride battery, a sintered nickel substrate or a three-dimensional nickel porous material serving as a current collector is used as an active material holding material but it has scarcely been investigated to use nickel as the material of a positive electrode for a lithium battery which is a nonaqueous electrolyte battery. The reason is that not only nickel is dissolved in an electrolyte but also it is feared that nickel is deposited on a negative electrode to cause the short-circuit of the battery. Also, because $LiCoO_2$, $LiNiO_2$, $V_2O_5$, $LiMn_2O_4$, etc., which are general as positive electrode active materials used for lithium batteries are particles of about 20 $\mu$m average diameter produced by burning usually at a temperature of 500° C. or higher called a solid phase method, it is particularly impossible, in fact, to apply these particles to a sintered nickel substrate having an average pore diameter of about 10 $\mu$m.

SUMMARY OF THE INVENTION

It is an object of the present invention to provide a lithium battery in that nickel oxyhydroxide is practically used as a new material for a lithium ion battery which is filled in an electro-conductive three-dimensional porous material or a sintered nickel substrate to improve the performance of a lithium ion battery, and to prevent the dissolution of nickel when the material is particularly nickel and the occurrence of the short-circuit.

In a positive electrode for a lithium battery according to the present invention, nickel oxyhydroxide as a positive active material is held in an electro-conductive three-dimensional porous material.

In the positive electrode for a lithium battery according to the present invention, the positive active material containing cobalt is preferably held by the electro-conductive three-dimensional porous material. In this case, it is suitable that the content of cobalt is from 2 to 50 mol %.

In the positive electrode for a lithium battery according to the present invention, the material of the electro-conductive three-dimensional porous material for nickel oxyhydroxide is preferably aluminum, nickel, carbon, or stainless steel.

In the positive electrode for a lithium battery according to the present invention, nickel oxyhydroxide is preferably held in a sintered nickel substrate.

In the positive electrode for a lithium battery, nickel oxide or nickel oxyhydroxide is preferably formed on the surface of the sintered nickel substrate.

In the positive electrode for lithium battery, a material containing at least one selected from the group of cobalt oxyhydroxide, metallic cobalt, cobalt oxide, tricobalt tetroxide, lithium cobaltate, and proton-containing lithium cobaltate, is preferably further held in electro-conductive three-dimensional porous material.

The present invention provides a battery having the positive electrode as described above.

DETAILED DESCRIPTION OF THE INVENTION

Figure 1:
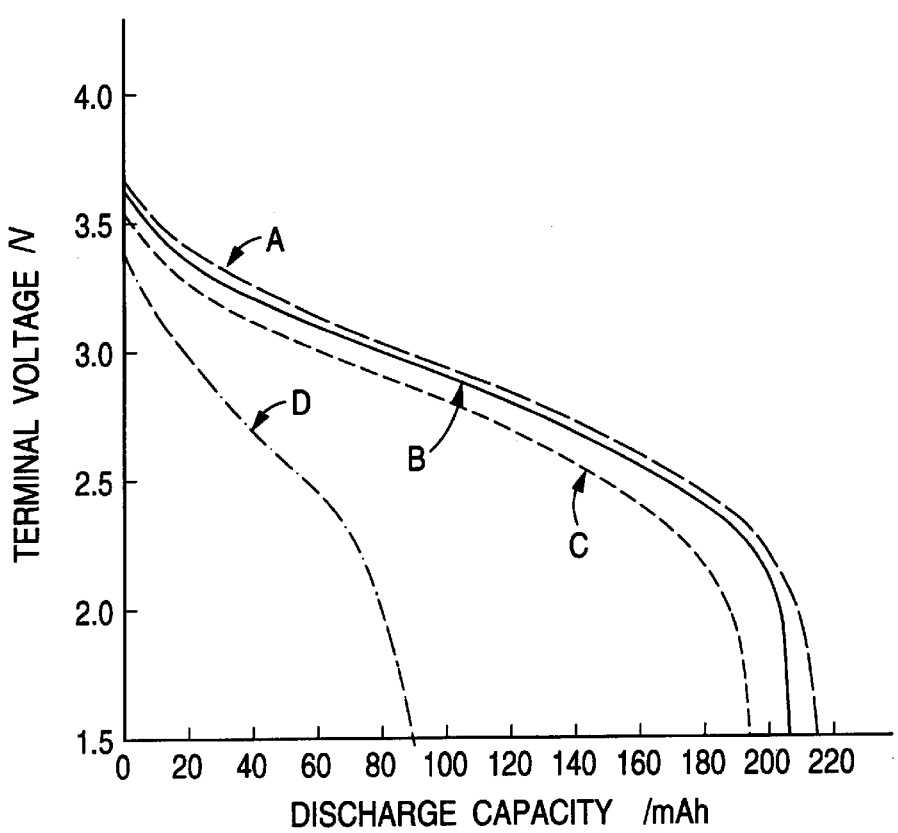
FIG. 1 is a view showing the discharging characteristics of the positive electrodes of the present invention and a conventional positive electrode.

Detailed description according to the present invention will be described as follows.

The feature of the present invention is not in that nickel oxyhydroxide is held in a nickel mesh as disclosed in Unexamined Japanese Patent Publication (kokai) No. Sho-63-19769 but in that nickel oxyhydroxide is held in a sintered nickel substrate or in an electro-conductive three-dimensional porous material. Such an electro-conductive three-dimensional porous material is used, at present, as an active material-holding material of the nickel hydroxide positive electrode of a nickel-cadmium battery or a nickel-hydride battery and in the present invention, a porous material of aluminum, nickel, carbon, stainless steel and the like can be used. In particular, in the case of holding it in the sintered nickel substrate, when an oxide coating or a coating of nickel oxyhydroxide is formed on the surface of the sintered nickel substrate, the life is prolonged and the reliability is improved.

Furthermore, when the positive electrode contains at least one selected from the group of cobalt oxyhydroxide, metallic cobalt, cobalt oxide, tricobalt tetroxide, lithium cobaltate, and proton-containing lithium cobaltate, charging and discharging efficiently proceed.

The positive electrode charging and discharging reactions of the lithium battery using nickel oxyhydroxide as the positive electrode seem to be the following equations wherein lithium ion is intercalated or deintercalated in nickel oxyhydroxide.

Discharging: $NiOOH + Li^+ + e^- \rightarrow LiHNiO_2$

Charging: $NiOOH + Li^+ + e^- \leftarrow LiHNiO_2$

In this case, it is considered that the electro-conductivity of lithium-containing nickel oxyhydroxide ($LiHNiO_2$) formed by discharging is lowered as compared with that of nickel oxyhydroxide (NiOOH). As the result thereof, the collecting function is gradually spoiled and the utilization coefficient is lowered.

The reason why the characteristics are improved according to the present invention has not yet been clarified. However, because when the electro-conductive three-dimensional porous material is used, the active material is filled therein in the state that the collecting structure is strongly formed, the contact state of the current collector and the active material or the active materials each other is improved and the diffusion by the intercalation of lithium ion. Therefore, an electrochemical reaction of nickel oxyhydroxide as a new active material occurs uniformly, whereby the charging and discharging characteristics and the charging-discharging cycle performance are improved.

Also, it seems that the performance is improved because of the following reasons. By using at least one kind selected from the group of cobalt oxyhydroxide (CoOOH, $HCoO_2$), metallic cobalt, cobalt oxide, tricobalt tetroxide, lithium cobaltate or proton-containing lithium cobaltate ($HLi_xCoO_2$, $0<x\leq1$), a current collecting network of the active materials each other is formed, the diffusion by intercalation of lithium ion which becomes an electrochemical reaction of nickel oxyhydroxide uniformly proceeds and also the active materials are uniformly charged in the charging step.

EXAMPLES

The present invention is explained below using examples of the present invention.

Example 1

After filling a foamed aluminum metal substrate having a porosity of 80% with a mixed paste of 20 ml of a solution of n-methyl-2-pyrrolidene containing 1% polyvinylidene difluoride and 20 parts of a nickel oxyhydroxide powder containing cobalt of 2 mol %[{Co/(Ni+Co)}×100], the foamed metal plate was dried at 130° C. to prepare a positive electrode A of the present invention having a size of 30 mm×40 mm×0.8 mm and a nominal capacity of 200 mAh.

Example 2

After filling a foamed aluminum substrate having a porosity of 80% with a mixed paste of 15 ml of an aqueous dispersion of a nickel oxyhydroxide powder of 20 μm average diameter, the foamed metal plate was dried at 130° C. to prepare a positive electrode B of the present invention having a size of 30 mm×40 mm×0.8 mm and a nominal capacity of 200 mAh.

Example 3

After filling a fibrous aluminum metal substrate having a porosity of 80% with a mixed paste of 15 ml of an aqueous dispersion of 2% by weight a polytetrafluoroethylene powder and 20 parts of a nickel oxyhydroxide powder of 20 μm average diameter, the electrode was dried at 130° C. to prepare a positive electrode C of the present invention having a size of 30 mm×40 mm×0.8 mm and a nominal capacity of 200 mAh.

Comparative Example 1

For comparison, after mixing 10 parts of graphite as an electro-conductive material and 50 parts of a nickel oxyhydroxide powder of 20 μm average diameter, the mixture was press-molded at a pressure of 500 kg/cm$^2$, the molded mixture was covered with a stainless steel wire gauze of 130 mesh to prepare a conventional press-type positive electrode D having a diameter of 32 mm, a thickness of 0.9 mm, and a nominal capacity of 200 mAh.

Then, using two metallic lithium center electrodes each having the same size as each positive electrode described above and 300 ml of an electrolyte consisting of a mixed solution of ethylene carbonate containing 1M of lithium perchlorate and diethyl carbonate, each of the batteries A, B, and C of the present invention and the conventional battery D was prepared by combining with each of the positive electrodes described above.

The discharge characteristics of each of the batteries when after charging the battery until the terminal voltage became 4.1 V at 20° C. and 20 mA, the battery was discharged until 1.5 V at 40 mA were shown in FIG. 1. In addition, the 1st cycle was started from discharging.

As seen from FIG. 1, it can be understood that the discharge performances of the batteries using the positive electrodes A, B, and C of the present invention are clearly excellent as compared with that of the conventional battery. That is, it can be seen that the performance of the battery using the positive electrode using the three-dimensional porous substrate having a good current collecting property is better than the performance of the conventional press-type battery.

Figure 2:
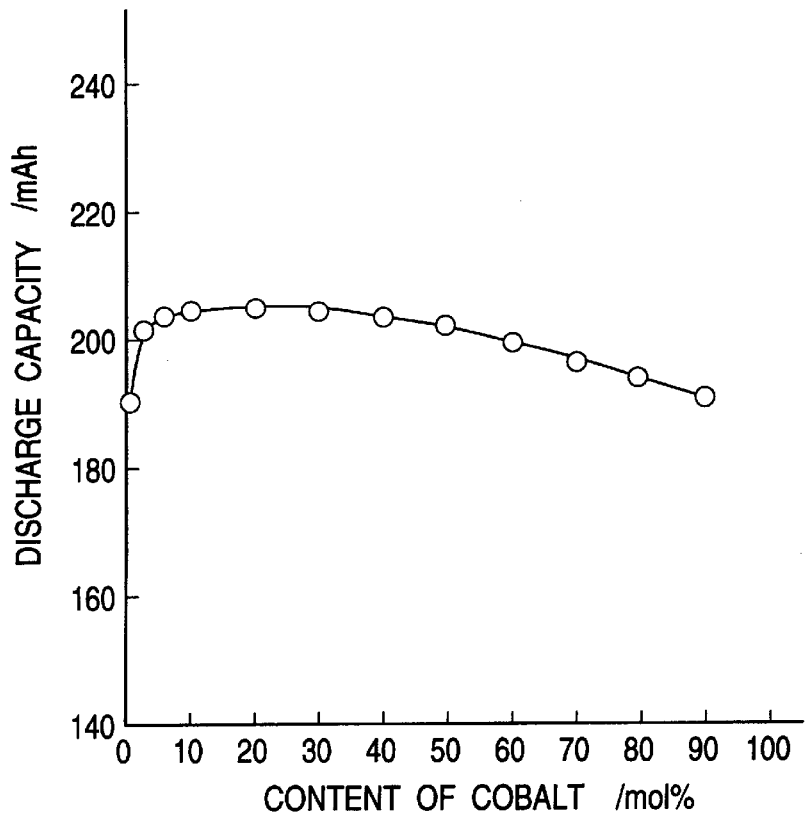
FIG. 2 is a view showing the relation of the discharging capacity of a positive electrode and the content of cobalt.

Also, similar batteries were prepared using nickel oxyhydroxide ($Ni_{1-x}Co_xOOH$) having each of changed contents of cobalt in Example 1 and the relation between the discharge capacity when after charging until the terminal voltage became 4.1 V at 20° C. and 40 mA, each battery was discharged until 2.0 V at 100 mA and the cobalt content {Co/(Ni+Co)×100 mol %} was shown in FIG. 2.

It can be understood that the addition of cobalt has an effect even in the case of using the substrate having a good current collecting property as in the present invention. The preferred content of cobalt is from 2 to 90 mol % but the cobalt content exceeding 50 mol % is undesirable because it becomes expensive. The effect of cobalt is assumed to be that the diffusion of lithium becomes more easy and the active materials electrochemically uniformly. Further, it is considered that as the result thereof, the performance is improved. In this case, it is advantageous to form a solid solution of nickel oxyhydroxide and cobalt oxyhydroxide.

The reason that the performances of the positive electrode of the present invention and of the battery using it are excellent as described above is assumed to be caused by the following reasons. When the three-dimensional porous substrate having the functions of both the active material holder and the current collector is used, the electric contact of the nickel oxyhydroxide active material and the current collector is good. The contact state of the nickel oxyhydroxide particles, which are active materials, each other is good. Furthermore, it is assumed that the contact resistance among the particles becomes small, and the diffusion of the lithium ions, which is the rate-determining step of the reaction, becomes easy among the particles.

In addition, in the case of using aluminum or carbon as the material for the three-dimensional porous substrate, when the heat treatment is carried out in the atmosphere containing oxygen, a thick oxide film layer is liable to form on the surface thereof. Accordingly, it sometimes happens that the mechanical strength of the electrode is lowered and the electro-conductivity thereof is lowered. Thus it is preferred that after filling the three-dimensional porous substrate with nickel oxyhydroxide, the porous electrode is dried under the environment having a less oxygen content than an air atmosphere.

Nickel oxyhydroxide may be the β-type, γ-type, or the mixture thereof. In particular, in the case of the aluminum three-dimensional porous substrate, because a hydroxide containing water is also formed, β-NiOOH having a less content of γ-NiOOH, and preferably having no water of crystallization is preferred.

In addition, in the above-described Examples 1 to 3, metallic lithium was used as a negative electrode but nickel oxyhydroxide in a discharged state, a carbon material such as graphite can be used as a negative electrode active material thereby to construct a lithium ion battery. Furthermore, when $LiC_6$ is used as a negative electrode active material and nickel oxyhydroxide is used as the positive electrode, a lithium ion battery is also constructed. In the present invention, the term "lithium battery" also includes these batteries and according to the present invention, such excellent lithium batteries can be provided.

Example 4

A sintered nickel substrate (using a nickel gauze of 100 mesh as the core material) having a porosity of about 85% obtained by sintering a carbonyl nickel powder, which was used as the active material holder of a sintered nickel-cadmium battery, was heated for 30 minutes at 200° C. in an air atmosphere to form a thin film of nickel oxide on the surface thereof.

Then, by applying a so-called vacuum impregnation method which was widely used as a production method of a nickel hydroxide positive electrode of a nickel-cadmium battery, a substrate containing nickel hydroxide was prepared. That is, by repeatedly carrying out 6 times a known operation that after vacuum impregnating the sintered nickel substrate with an aqueous solution of 4M nickel nitrate containing cobalt of 3 mol % [{Co/(Ni+Co)}×100] at 5 mmHg, the impregnated substrate was neutralized with alkaline solution of 5M sodium hydroxide and after washing with hot water, the substrate was dried at 100° C., an electrode filled with nickel hydroxide was prepared.

Then, the electrode was immersed in an alkaline solution of 4.5M potassium hydroxide and using 2 nickel plates as the counter electrode, an electric current was passed through the anode at a current density of 5 mA/cm$^2$ for 3 hours. Thereafter, after removing the remaining alkali components from the electrode by washing with hot water, the electrode was dried at 120° C. to prepare a nickel oxyhydroxide positive electrode E of the present invention having a size of 30 mm×30 mm×0.7 mm and a nominal capacity of 300 mAh.

Example 5

A sintered nickel substrate (using a nickel gauze of 100 mesh as the core material) having a porosity of about 85% obtained by sintering a carbonyl nickel powder, which was used as the active material holder of a sintered nickel·cadmium battery, was prepared.

Then, by applying a so-called vacuum impregnation method which was widely used as a production method of a nickel hydroxide positive electrode of a nickel·cadmium battery, a substrate containing nickel hydroxide was prepared. That is, by repeatedly carrying out 6 times a known operation that after vacuum impregnating the sintered nickel substrate with 4M nickel nitrate solution containing cobalt of 3 mol % [{Co/(Ni+Co)}×100] at 5 mmHg, the impregnated substrate was neutralized with alkaline solution of 5M sodium hydroxide and after washing with hot water, the substrate was dried at 100° C., an electrode filled with nickel hydroxide was prepared.

Then, the electrode was immersed in an alkaline solution of 4.5M potassium hydroxide and using 2 nickel plates as the counter electrode, an electric current was passed through the anode at a current density of 5 mA/cm$^2$ for 3 hours. Thereafter, after removing the remaining alkali components from the electrode by washing with hot water, the electrode was hot-blast dried at 100° C. and further heat-treated for 2 hours at 135° C. to form a thin film of nickel oxide on the surface of the nickel substrate, whereby a nickel oxyhydroxide positive electrode F of the present invention having a size of 30 mm×40 mm×0.8 mm and a nominal capacity of 300 mAh was prepared.

Example 6

After repeatedly carrying out 6 times a conventionally known operation that after vacuum impregnating a sintered nickel substrate (using a nickel gauze of 100 mesh) having a porosity of about 85% obtained by sintering a carbonyl nickel powder with 4M nickel nitrate solution containing cobalt of 3 mol % [{Co/(Ni+Co)}×100] at 5 mmHg, the impregnated substrate was neutralized with alkaline solution of 5M sodium hydroxide and after washing with hot water, the substrate was dried at 100° C., an electrode filled with nickel hydroxide was prepared.

Then, the electrode was immersed in alkaline solution of 5M sodium hydroxide and using 2 nickel plates as the counter electrode, current was passed through the anode at a current density of 5 mA/cm$^2$ for 3 hours to convert nickel hydroxide into nickel oxyhydroxide, and thereafter, the electrode was dried for 1 hour at 110° C. to prepare a nickel oxyhydroxide positive electrode G of the present invention having a size of 30 mm×40 mm×0.8 mm and a nominal capacity of 300 mAh. On the surface of the substrate of the positive electrode was formed a thin film of nickel oxyhydroxide.

Example 7

After repeatedly carrying out 6 times a conventionally known operation that after vacuum impregnating a sintered nickel substrate (using a nickel gauze of 100 mesh) having a porosity of about 85% obtained by sintering a carbonyl nickel powder with an aqueous with 4M nickel nitrate containing cobalt of 3 mol % [{Co/(Ni+Co)}×100] at 5 mmHg, the impregnated substrate was neutralized with alkaline solution of 5M sodium hydroxide and after washing with hot water, the substrate was dried at 100° C., an electrode filled with nickel hydroxide was prepared.

Then, after immersing the electrode in alkaline solution of 1M sodium hydroxide having dissolved therein potassium peroxodisulfate to convert nickel hydroxide into nickel oxyhydroxide, the electrode was washed with water and dried for 1 hour at 100° C. to prepare a positive electrode H of the present invention having a size of 30 mm×40 mm×0.8 mm and a nominal capacity of 300 mAh. It was confirmed by an X-ray diffraction analysis that a thin film of nickel oxyhydroxide was formed on the surface of the substrate of the electrode.

Comparative Example 2

For comparison, 10 parts of graphite as an electroconductive material was mixed with 50 parts of a nickel oxyhydroxide powder of 20 $\mu$m average diameter containing cobalt of 2 mol % [{Co/(Ni+Co)}×100] and after further mixing the mixture obtained with an n-methyl-2-pyrrolidene solution containing 1% polyvinylidene difluoride, the resultant mixture was coated on a current collector made of aluminum. Thereafter, the collector was washed with water at 100° C. and dried for 1 hour at 100° C., whereby a comparative positive electrode having a size of 50 mm×60 mm×0.8 mm and a nominal capacity of 300 mAh was prepared.

Then, using 2 metallic lithium plates each having the same size as each positive electrode described above and 300 ml of a mixed solution of ethylene carbonate containing 1M of lithium perchlorate and diethyl carbonate as an electrolyte, each of the batteries E, F, G, and H of the present invention and the comparative battery I was prepared by using each of the positive electrodes described above.

Figure 3:
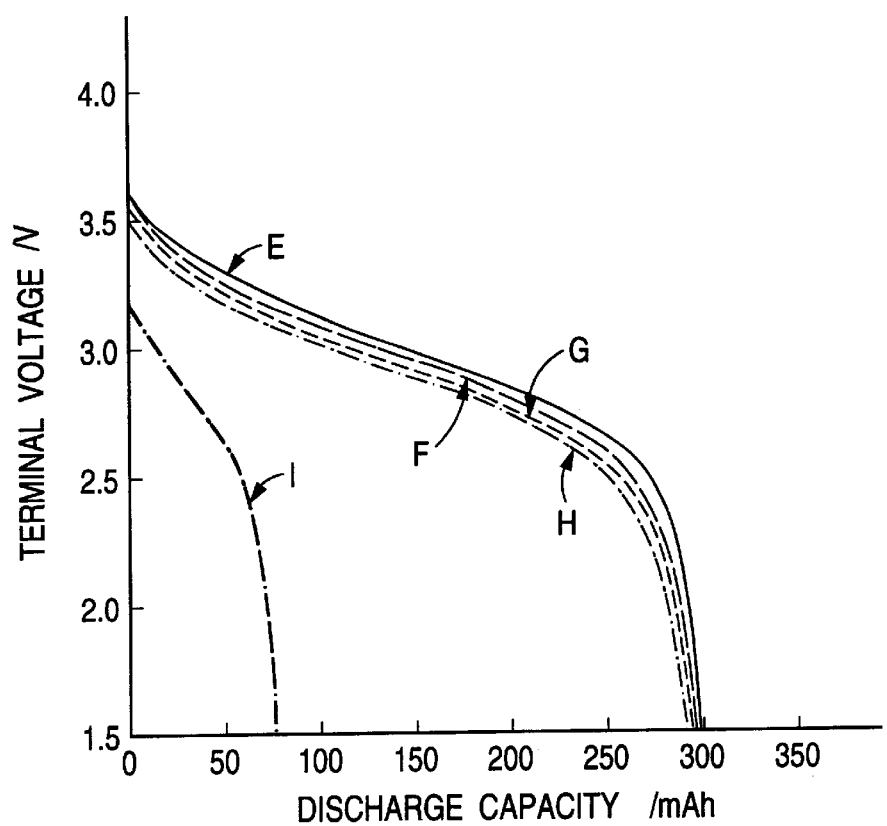
FIG. 3 is a view comparing the discharging characteristics of the battery using the positive electrode of the present invention and those of the battery using a conventional positive electrode.
Figure 4:
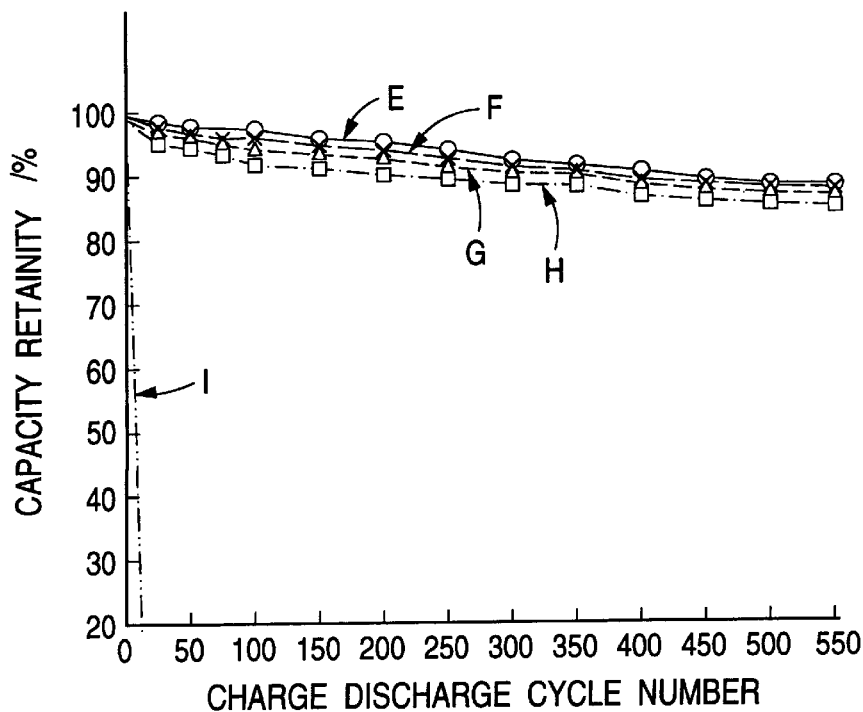
FIG. 4 is a view comparing the capacity transition with the charge-discharge cycle of the battery using the positive electrode of the present invention and that of the battery using a conventional positive electrode.

The discharge characteristics of each of the batteries when after charging the battery until the terminal voltage became 4.1 V at 20° C. and 30 mA, the battery was discharged until 1.5 V at 40 mA were shown in FIG. 3. Also, the change in discharge capacity accompanied by the charge-discharge cycle is shown in FIG. 4 with the initial capacity as 100. In addition, the 1st cycle was started from discharging.

From the figures, it can be understood that the discharge performances of the batteries E, F, G and H of the present invention are clearly excellent as compared with that of the comparison battery. Also, it can be seen that the life performance is excellent in the batteries E, F, G, and H as compared with the battery I.

In this case, in the batteries each using the positive electrode of the present invention, wherein the oxide film or the nickel oxyhydroxide film was formed on the nickel substrate, a short-circuit did no occur and the battery showed good characteristics until 500 cycles. This is assumed to be that nickel as the base is prevented from being dissolved in the electrolyte by the film of nickel oxide or nickel oxyhydroxide formed on the surface of the sintered nickel substrate.

In the examples, cobalt-containing nickel oxyhydroxide ($Ni_{1-x}Co_xOOH$) was used and it was preferred that the content of cobalt was at least 2 mol % [{Co/(Ni+Co)}×100]. It can be seen that the addition of cobalt has an effect even in the case of using the substrate having a good current collecting property as in the present invention. The preferred content of cobalt is from 2 to 90 mol % but the cobalt content exceeding 50 mol % is undesirable because in this case, the cost is increased. The effect of cobalt is assumed to be that the diffusion of lithium becomes more easy and the active materials electrochemically work, and it is considered that as the result thereof, the performance is improved. In this case, it is advantageous to form a solid solution of nickel oxyhydroxide and cobalt oxyhydroxide.

The reason that the performances of the positive electrode of the present invention and of the battery using it are excellent as described above is assumed to be caused by that when the three-dimensional porous material having the functions of both the active material holder and the current collector is used, the electric contact of the nickel oxyhydroxide active material, and the current collector is good and the contact state of the nickel oxyhydroxide particles, which are active materials, each other is good. Furthermore, it is assumed that the contact resistance among the particles becomes small and the diffusion of the lithium ions, which is the rate-determining step of the reaction becomes easy among the particles.

Nickel oxyhydroxide may be the β-type, γ-type, or the mixture thereof as described above but, in particular, in the case of the aluminum three-dimensional porous substrate, because a hydroxide containing water is also formed, β-NiOOH having a less content of γ-NiCOOH, and preferably having no water of crystallization is preferred.

In addition, in the above-described examples, metallic lithium was used as the negative electrode but when after making nickel oxyhydroxide a discharged state, a carbon material such as, for example, graphite is used as the negative electrode active material, a lithium ion battery is constructed. Furthermore, when $LiC_6$ is used as the negative electrode active material and nickel oxyhydroxide is used as the positive electrode, a lithium ion battery is also constructed.

Example 8

After mixing 3 parts of acetylene black as an electro-conductive material, 2 parts of a cobalt oxyhydroxide powder of 10 μm, and 90 parts of a nickel oxyhydroxide powder of 20 μm containing cobalt of 2 mol % [{Co/(Ni+Co)}×100], the mixture was further kneaded with an n-methyl-2-pyrrolidene solution containing 2% polyvinylidene fluoride, the kneaded mixture was coated on an aluminum sheet having a width of 20 mm, a length of 480 mm and a thickness of 20 μm, dried for 1 hour at 120° C., and the aluminum sheet was pressed to provide a positive electrode having a thickness of 170 μm.

After placing an element formed by rolling up the above-described positive electrode and a metallic lithium thin plate having a thickness of 160 μm as a negative electrode via a polypropylene film having a thickness of 15 μm in a stainless steel case having a width of 22 mm, a height of 47 mm and a thickness of 6.5 mm, and electrolyte made up of a mixed solution of propylene carbonate and ethylene carbonate containing 1M $LiClO_4$ was poured therein to prepare a battery J of the present invention having a nominal capacity of 300 mAh.

Furthermore, batteries K, L, M, and N having the construction as the above-described battery J were prepared except that each of a cobalt oxide powder, a tricobalt tetroxide powder, a lithium cobaltate powder, and a proton-containing lithium cobaltate powder respectively was used in place of cobalt oxyhydroxide in the battery J.

The capacity when after discharging each of these lithium batteries to 1.5V at 60 mA, the battery was further charged to 3.7 V at 30 mA, and then discharged to 1.5 V at 60 mA was shown in Table 1. For comparison, a battery O having the same construction as the battery J was prepared except that acetylene black was used in place of the cobalt oxyhydroxide powder and the result of carrying out the same test was also shown in the same table.

TABLE 1

| Battery | Discharge Capacity |
| --- | --- |
| J | 330 mAh |
| K | 323 mAh |
| L | 320 mAh |
| M | 310 mAh |
| N | 320 mAh |
| O | 235 mAh |

From the Table 1, it can be seen that the capacities of the batteries J, K, L, M, and N according to the present invention are greatly larger than that of the comparative battery O.

That is, it can be seen by using each of cobalt oxyhydroxide, the cobalt oxide powder, the tricobalt tetroxide powder, the lithium cobaltate powder, and the proton-containing lithium cobaltate ($H_{0.25}Li_{0.75}CoO_2$) powder, the capacity is remarkably improved. As the reason thereof, it is considered that by the addition of the above-described powder, the current collecting property of the active material becomes good and the diffusion of the active material becomes easy, which result in that the active material electrochemically works uniformly and the performance is improved.

In the above cases, each of cobalt oxyhydroxide, the cobalt oxide powder, the tricobalt tetroxide powder, the lithium cobaltate powder, and the proton-containing lithium cobaltate powder was added singly but in other tests of using combinations of plural kinds of them, the similar results were obtained. This shows that the addition of at least one kind selected from the group of them is effective.

Example 9

A sintered nickel substrate (using a nickel gauze as the core material) having a porosity of about 85% obtained by sintering a carbonyl nickel powder which was used as the active material holder of a sintered type nickel-cadmium battery was prepared and by applying a so-called vacuum impregnation method, which was widely used as the production method of a nickel hydroxide positive electrode of a nickel-cadmium battery, to the substrate, a substrate containing nickel hydroxide was prepared.

Practically, by repeatedly carrying out 6 times an operation that, first, after vacuum impregnating the sintered nickel substrate with 4M nickel nitrate solution containing cobalt of 2 mol % [{Co/(Ni+Co)}×100] at 5 mmHg, the impregnated substrate was neutralized in an aqueous solution of 5M sodium hydroxide and after washing with hot water, the substrate was dried at 100° C., an electrode filled with nickel hydroxide was prepared.

Then, after immersing the electrode in an aqueous solution of 1M sodium hydroxide and further, the electrode was neutralized with alkaline solution of 5M sodium hydroxide, washed, and dried to form cobalt hydroxide. Thereafter, the electrode was immersed in alkaline solution of 4.5M sodium hydroxide, using 2 nickel plates as the counter electrode, and a current was passed through the anode at a current density of 3.5 mA/cm$^2$ for 10 hours. Finally, after removing the remaining alkali components from the electrode by washing with hot water, the electrode was dried at 120° C. to prepare a nickel oxyhydroxide positive electrode P of the present invention having a size of 30 mm×40 mm×0.8 mm and a nominal capacity of 300 mAh was prepared.

Example 10

After filling a foamed nickel substrate (Celmett, trade name, made by Sumitomo Electric Industries, Ltd.) having a porosity of 95%, which was used as the active material holder of a nickel-cadmium battery, with a paste of 5 parts of a metallic cobalt powder, 95 parts of a nickel hydroxide powder having an average particle size of 10 μm, and 90 ml of 0.1% by weight carboxymethyl cellulose, the substrate was dried at 100° C. and pressed.

The electrode was immersed in solution of 5M sodium hydroxide, and using 2 nickel plates as the counter electrode, a current was passed through the anode for 12 hours at a current density of 3.5 mA/cm$^2$. Then, after removing the remaining alkali components by washing with hot water, the electrode was dried by hot blast at 100° C. and further heat-treated for 2 hours at 135° C. in an air atmosphere to prepare a nickel oxyhydroxide positive electrode Q having a size of 30 mm×40 mm×0.8 mm and a nominal capacity of 350 mAh.

Example 11

After filling a foamed nickel substrate (Celmett, trade name, made by Sumitomo Electric Industries, Ltd.) having a porosity of 95%, which was used as the active material holder of a nickel-cadmium battery, with a paste of 10 parts of a metallic cobalt powder, 90 parts of a nickel hydroxide powder having an average particle size of 10 $\mu$m, and 90 ml of 0.1% by weight carboxymethyl cellulose, the substrate was dried at 100° C. and pressed.

The electrode was immersed in alkaline solution of 5M sodium hydroxide, and using 2 nickel plates as the counter electrode, an electric current was passed through the anode for 11 hours at a current density of 3.5 mA/cm$^2$. Then, after removing the remaining alkali components by washing with hot water, the electrode was dried by hot blast at 100° C. and further heat-treated for 2 hours at 135° C. in an air atmosphere to prepare a nickel oxyhydroxide positive electrode R having a size of 30 mm×40 mm×0.8 mm and a nominal capacity of 350 mAh.

Then, using 2 metallic lithium plates each having the same size as each positive electrode described above and 300 ml of a mixed solution of ethylene carbonate containing 1M of lithium perchlorate and diethyl carbonate as an electrolyte, each of the batteries P, Q, and R of the present invention was prepared by using each of the positive electrodes described above.

For comparison, by the same construction as Example 9 except that cobalt hydroxide was not formed, a nickel oxyhydroxide positive electrode S having a size of 30 mm×40 mm×0.8 mm and a nominal capacity of 350 mAh was prepared. Also, by the same construction as Example 10 except that the metallic cobalt powder was not contained, a nickel oxyhydroxide positive electrode T having a size of 30 mm×40 mm×0.8 mm and a nominal capacity of 350 mAh was prepared. Furthermore, by the same construction as Example 11 except that the cobalt oxide powder was not contained, a nickel oxyhydroxide positive electrode U having a size of 30 mm×40 mm×0.8 mm and a nominal capacity of 350 mAh was prepared. Also, batteries S, T, and U were prepared using these positive electrodes respectively.

Figure 5:
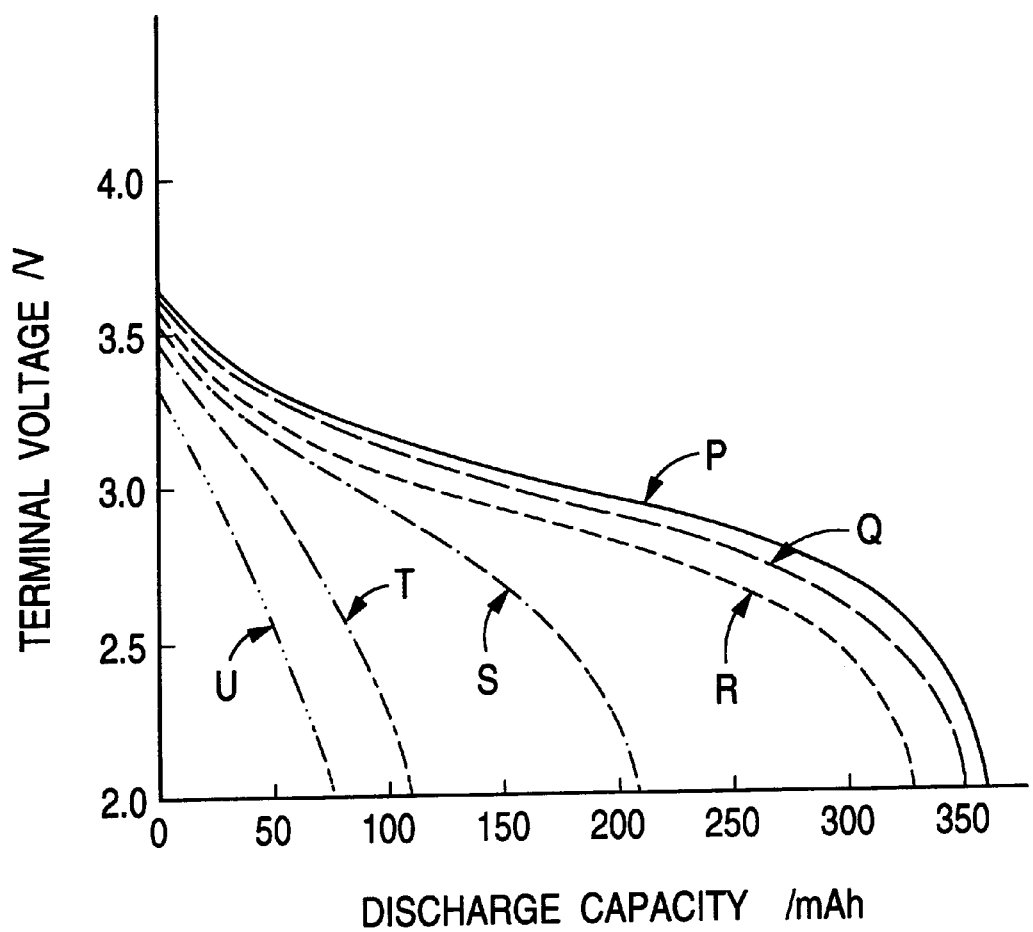
FIG. 5 is a view comparing the discharging characteristics of the battery using the positive electrode of the present invention and those of a standard battery.

The discharging characteristics when after charging each of the batteries until the terminal voltage became 4.1 V at 20° C. and 30 mA and the battery was discharged until 1.5 V at 70 mA were shown in FIG. 5. From FIG. 5, it can be seen that the discharging performances of the batteries P, Q, and R of the present invention are greatly excellent as compared with the batteries S, T, and Q.

Accordingly, even in the case of using the three-dimensional current collector, it is assumed that when the cobalt compound is added, the current collecting property among the active materials becomes good and the diffusion of the active materials becomes more easy, and the active materials electrically work uniformly, and it is considered that as the result thereof, the performance is improved.

In Examples 9 and 10, metallic cobalt or cobalt oxide was added but it is considered that a part of it was changed into cobalt hydroxide or cobalt oxyhydroxide by the anodic oxidation in the alkali solution.

It is assumed that according to the present invention, when the three-dimensional porous material is used, the electric contact between the active material and the current collector becomes good, the contact state of the nickel oxyhydroxide particles, which are active materials, each other is good, furthermore, the contact resistance among the particles is low, and also, the diffusion of the lithium ion, which is the rate-determining step of the reaction becomes easy among the particles.

In the case of using the sintered nickel substrate, it is assumed that when an oxide film or a nickel oxyhydroxide film is formed on the nickel substrate, the film functions as a protective film to prevent nickel as the base from dissolving in an electrolyte. Also, it is assumed that the electric contact of the active material and the current collector is good, further, the contact state of the nickel oxyhydroxide particles, which are active materials, each other is good, the contact resistance among the particles is low, and also, the diffusion of the lithium ion, which is the rate-determining step of the reaction becomes easy among the particles. Thereby, a lithium battery of a high performance can be provided.

According to the invention of a positive electrode for a lithium battery wherein lithium is intercalated into nickel oxyhydroxide by discharging and lithium is deintercalated from nickel oxyhydroxide by charging, characterized in that the positive electrode contains at least one kind selected from the group of cobalt oxyhydroxide, metallic cobalt, cobalt oxide, tricobalt tetroxide, lithium cobaltate, and proton-containing lithium cobaltate, and the invention of a lithium battery equipped with the above-described positive electrode, the characteristics of the lithium battery using nickel oxyhydroxide as the positive electrode are improved and the lithium which is inexpensive and has a good performance can be provided.

The nickel oxyhydroxide may be the $\beta$-type, the $\gamma$-type, or the mixture thereof but $\beta$-NiOOH having a less content of $\gamma$-NiOOH and preferably having no water of crystallization is preferred.

In the examples, metallic lithium is used as a negative electrode but with nickel oxyhydroxide a discharged state, a carbon material such as graphite can be used as a negative electrode active material thereby to construct, a so-called lithium ion battery. Also, when $LiC_6$ is used as the negative electrode active material and nickel oxyhydroxide is used as the positive electrode, a lithium ion battery is constructed and as a matter of course, the above-described effects are obtained.

In addition, the technical idea of improving the performance by adding cobalt or a compound thereof to a nickel oxyhydroxide is a known means in the field of alkali battery as applied to a nickel positive electrode for a nickel-cadmium battery for improving the precharge in the battery or the active material utilization ratio in Unexamined Japanese Patent Publication (kokai) No. Sho-52-09127, National Technical Report, 27, 106(1986), 27th Denchi Touron-Kai Koen Youshishu, p. 47(1986), GS NEW-STECHNICAL REPORT 48, p23(1986), etc.

However, the present invention relates to the improvement of the new idea of using nickel oxyhydroxide as the positive electrode active material of a lithium battery, which is hitherto unexpected by a person skilled in the art and it shall be bear in mind that the present invention is not easily considered by a simple knowledge about alkali batteries.

What is claimed:
1. A positive electrode for a lithium battery comprising:
   a electro-conductive three-dimensional porous material; and
   an positive active material comprising nickel oxyhydroxide which is held in said electro-conductive three-dimensional porous material.

2. A positive electrode for a lithium battery according to claim 1, wherein said electro-conductive three-dimensional porous material comprises one of aluminum, nickel, carbon, and stainless steel.

3. A positive electrode for a lithium battery according to claim 2, wherein said electro-conductive three-dimensional porous material comprises one of nickel, carbon and stainless steel.

4. A positive electrode for a lithium battery comprising: an electro-conductive three-dimensional porous material; and a positive active material comprising nickel oxyhydroxide which is held in said electroductive three-dimensional porous material; wherein said electro-conductive three dimensional porous material consists of a coated or uncoated sintered nickel substrate.

5. A positive electrode for a lithium battery according to claim 4, wherein said sintered nickel substrate is coated with one of nickel oxide and nickel oxyhydroxide.

6. A lithium battery comprising a positive electrode comprising an electro-conductive three-dimensional porous material and a positive active material comprising nickel oxyhydroxide held therein.

7. A lithium battery according to claim 6, wherein said electro-conductive three-dimensional porous material comprises one of aluminum, nickel, carbon, and stainless steel.

8. A lithium battery according to claim 7, wherein said electro-conductive three-dimensional porous material comprises one of nickel, carbon, and stainless steel.

9. A lithium battery comprising a positive electrode comprising an electro-conductive three-dimensional porous material and a positive active material comprising nickel oxyhydroxide held therein, wherein said electro-conducitve three dimensional porous material consists of a coated or uncoated sintered nickel substrate.

10. A lithium battery according to claim 10 wherein said sintered nickel substrate is coated with one of nickel oxide and nickel oxyhydroxide.

11. A positive electrode for a lithium battery comprising:
an electro-conductive three-dimensional porous material; and
a positive active material comprising nickel oxyhydroxide which is held in said electro-conductive three-dimensional porous material;
wherein said positive active material further comprises cobalt.

12. A positive electrode for a lithium battery according to claim 11, wherein a content of cobalt is from 2 to 50 mol % [{Co/(Ni+Co)}×100].

13. A positive electrode for a lithium battery comprising:
an electro-conductive three-dimensional porous material; and
a positive active material comprising nickel oxyhydroxide and at least one material selected from the group consisting of cobalt oxyhydroxide, metallic cobalt, cobalt oxide, tricobalt tetroxide, lithium cobaltate, and proton-containing lithium cobaltate,
wherein said positive active material is held in said electro-conductive three-dimensional porous material.

14. A lithium battery comprising a positive electrode comprising an electro-conductive three-dimensional porous material and a positive active material comprising nickel oxyhydroxide held therein, wherein said positive active material further comprises cobalt.

15. A lithium battery comprising a positive electrode comprising an electro-conductive three-dimensional porous material and a positive active material comprising nickel oxyhydroxide held therein,
wherein said positive electrode further comprises a cobalt-containing material containing at least one member selected from the group consisting of cobalt oxyhydroxide, metallic cobalt, cobalt oxide, tricobalt tetroxide, lithium cobaltate, and proton-containing lithium cobaltate, said cobalt-containing material being held in said electro-conductive three-dimensional porous material.

* * * * *